Jan. 10, 1967

G. PRISLAN 3,297,423

DRAWING CHAMBER FOR THE CONTINUOUS
MANUFACTURING OF SHEET GLASS

Filed Sept. 16, 1963

INVENTOR
GEORGES PRISLAN
By Irwin A. Thompson
ATTY.

Jan. 10, 1967 G. PRISLAN 3,297,423
DRAWING CHAMBER FOR THE CONTINUOUS
MANUFACTURING OF SHEET GLASS
Filed Sept. 16, 1963 4 Sheets-Sheet 2
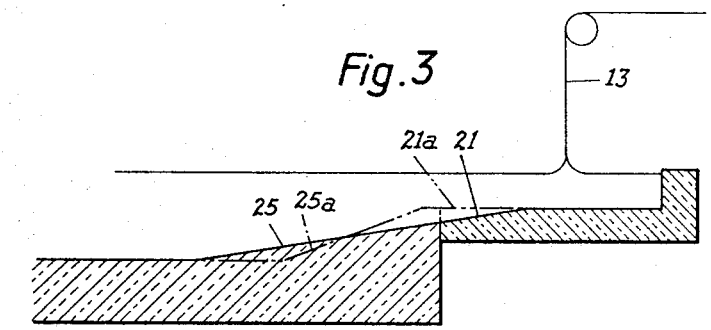
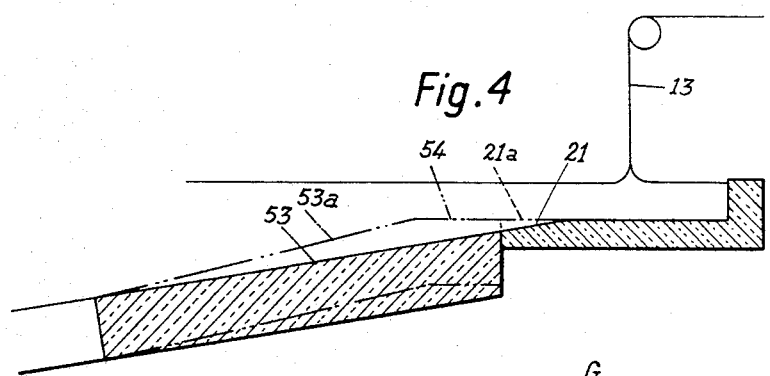
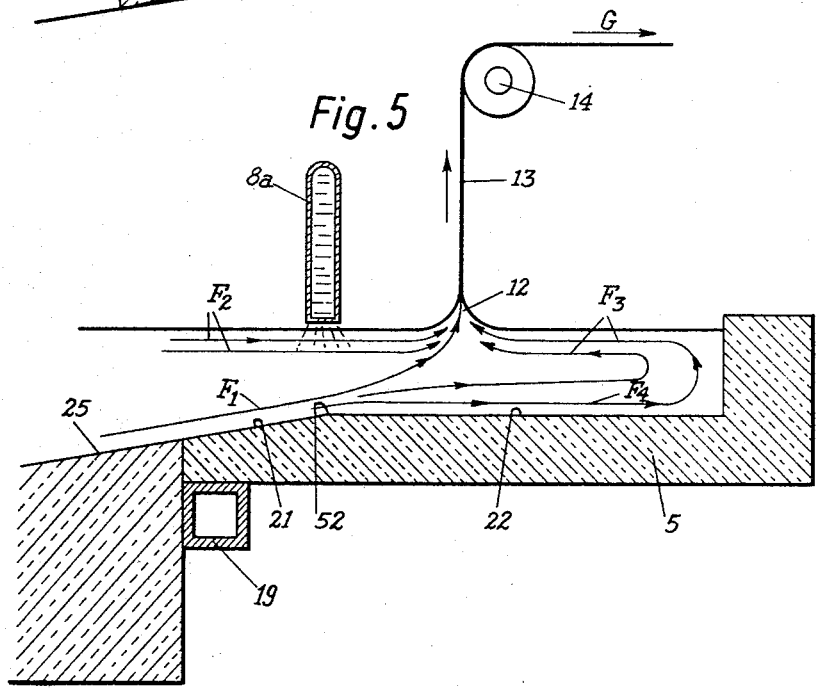
INVENTOR
GEORGES PRISLAN
By Irwin S. Thompson
ATTY.

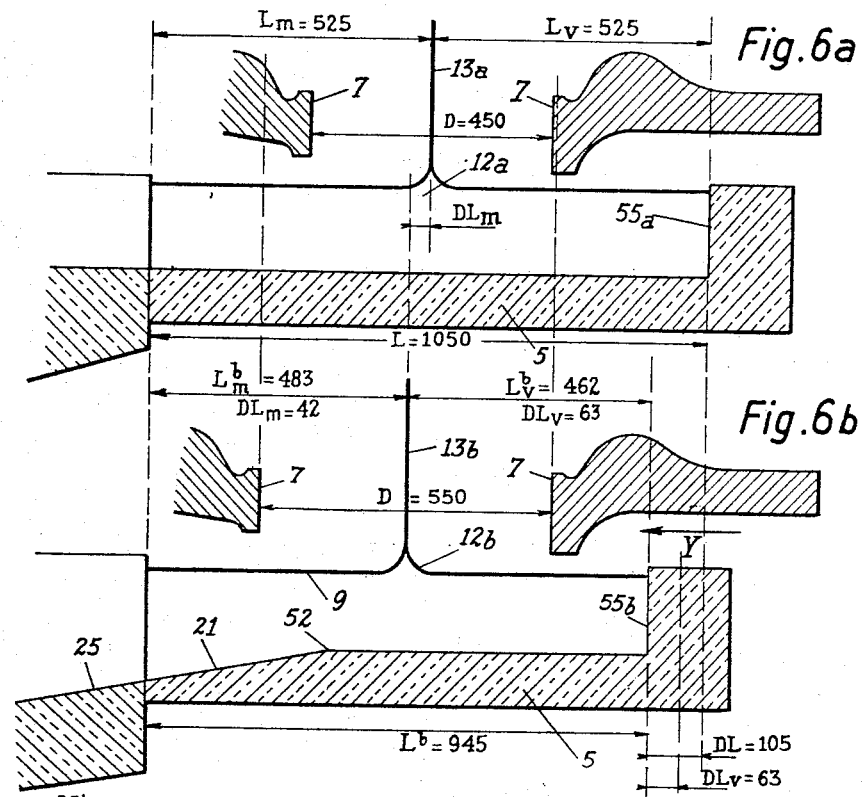

United States Patent Office 3,297,423
Patented Jan. 10, 1967

3,297,423
DRAWING CHAMBER FOR THE CONTINUOUS MANUFACTURING OF SHEET GLASS
Georges Prislan, Wingles, France, assignor to Société dite: Glaces de Boussois, Paris, France
Filed Sept. 16, 1963, Ser. No. 309,058
Claims priority, application France, Sept. 25, 1962, 910,338
7 Claims. (Cl. 65—204)

This invention relates to an improved installation and process for the vertical drawing of a soft glass ribbon in a draw pot upstream of which there is disposed a thermal conditioning chamber in which the glass bath is exposed to surface cooling.

The drawn glass ribbon which passes between two coolers disposed in the draw pot is subsequently bent into a horizontal direction by means of a bending roll and then advances to an annealing leer.

This type of sheet glass manufacturing is well-known and it is often called the Libbey-Owens process.

Although this process is widely used, it has some disadvantages which the present invention purports to obviate.

The first disadvantage of this process is its relatively low hourly yield.

The drawing speed in this process cannot be changed at will since there is a correlation between the drawing speed and the thickness of the obtained ribbon, all the other variables being kept constant. Thus, under normal operating conditions the drawing speed of the glass in the Libbey-Owens process for a determined glass thickness is low. One of the objects of this invention is to eliminate this disadvantage and to make possible an increase of the drawing speed for the purpose of increasing the hourly glass production.

A second disadvantage of the vertical drawing process including horizontal ending and horizontal forwarding of the drawn sheet resides in the irregularity of thicknesses of this ribbon. The thicknesses are measured along the same transverse line. It is also an object of this invention to eliminate this disadvantage. Other advantages of the invention will become apparent from the ensuing specification.

According to the invention the installation which comprises a draw pot, the bottom of which is horizontal below the drawn sheet, is characterized in particular by the fact that the bottom of the pot is provided, in its portion upstream with reference to the displacement of the glass, with an inclined spout which is aligned with the inclined bottom of the tank of the furnace.

Practice has yielded the surprising results that such an arrangement made possible substantial improvements in the regularity of thicknesses in the drawn glass.

It already has been proposed to build draw pots, the bottom of which is inclined from the upstream terminal edge to the terminal partition downstream. As far as structure is concerned, this invention differs from the above-mentioned arrangement in the fact that the bottom of the pot is inclined only along a portion of its length and that there is a horizontal edge at the junction with the horizontal portion.

The technical effects caused by these two arrangements are very different. In the arrangements heretofore known the continuity of the inclination between the bottom of the draw pot and the tank of the furnace has, by itself, no particular advantage, but on the other hand does have significant disadvantages.

Due to the continuous inclination of the bottom of the draw pot, the thickness of the glass bath has a very low value at downstream section. The cooling of such a thin glass layer is very rapid, which results in the risk of de-vitrification. Also, due to the substantial viscosity of the glass layer, the glass tends to adhere to the refractory walls in the terminal portion of the pot. For this reason the glass, which is drawn by the base portion of the ribbon, comes off irregularly.

These phenomena cause significant irregularities in the thickness of the drawn ribbon. To eliminate these phenomena attempts were made to re-heat in a special manner the bottom of the pot and the surface of the glass. This, however, resulted in a complicated structure of the pot. Even if the risk of de-vitrification can be avoided in this manner, the regularity in thickness and the speed of the drawing operation are not improved.

The apparatus according to the invention purports to obviate these disadvantages as will be seen later.

According to a preferred embodiment of the invention the joining edge between the inclined spout of the pot and the horizontal bottom thereof is disposed substantially below the upstream cooler defining one of the limits of the drawing chamber.

In practice, the frontal edge of the draw pot may be at a depth substantially between 220 and 225 millimeters with respect to the surface of the glass bath, while the horizontal portion of the bottom of the pot is located conveniionally at a depth between 170 and 175 millimeters.

According to a preferred embodiment of the invention it is proposed to combine the above-mentioned organization of the draw pot with a particular arrangement of the thermal conditioning chamber and of the drawing chamber as described in the copending concurrently filed patent application by the same inventor entitled "Improvement in the Continuous Manufacturing of Sheet Glass by Drawing," Serial No. 308,587, filed September 12, 1963.

According to an important feature of the above-mentioned application the ceiling of the thermal conditioning chamber is provided with oblique tubes which project therethrough and which are adapted to blow cooling air. These tubes are directed towards the glass bath and are inclined in the direction of its travel. By separately controlling the air emitted by each tube, it is possible to produce a differential convective effect from one side of the bath to the other. Such a system eliminates the irregularities in the thickness of the drawn ribbon.

The combination of such a system with an arrangement proposed by this invention results in a significant improvement in the drawing conditions (drawing speed and regularity of thicknesses).

As it will be seen when the specification proceeds, additional features may be incorporated in the draw pot in combination with the above-mentioned particular arrangements, for example, features relating to the downstream terminal wall of the pot with respect to the upstream spout.

The specification will be better understood with reference to the exemplary, and by no means limitative, drawings, wherein:

FIGS. 3 and 4 are two transverse schematic sections illustrating the invention as applied to two well-known installations;

FIG. 5 is an enlarged sectional schematic view explaining the dynamics of the glass currents;

FIGS. 6a and 6b are enlarged sectional elevation views illustrating two different arrangements of the drawing pot;

FIG. 8 is a comparative diagram of the drawing speeds.

Figure 1:
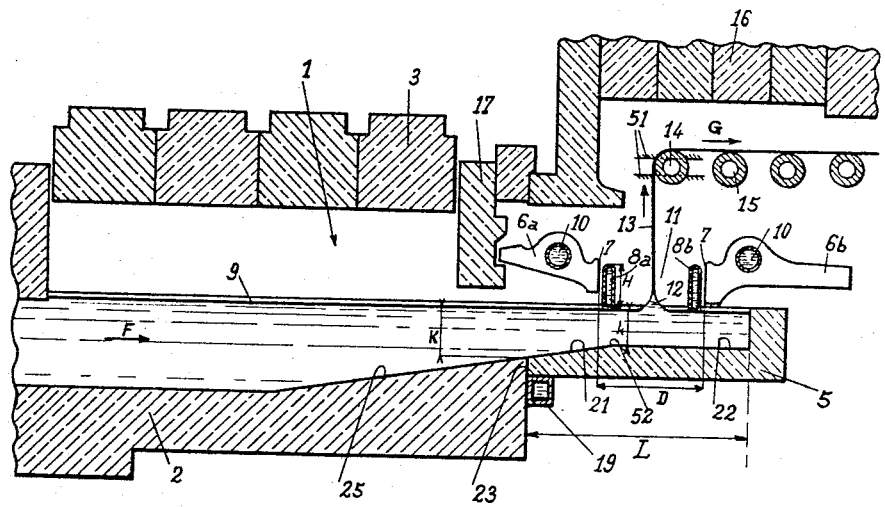
FIG. 1 is an axial section of a thermal conditioning chamber and of a draw pot arranged in accordance with the invention.

Referring now to FIG. 1, there is shown the terminal portion of an installation for the continuous fabrication of sheet glass by means of vertical drawing followed by a horizontal bending of the glass ribbon.

There is also shown a thermal conditioning chamber 1 (also named "cooling chamber" in the art) having a tank 2 which communicates upstream with a channel of the continuous furnace insuring a continuous supply of glass in a principal current designated by F.

Downstream of chamber 1 there is disposed a draw pot 5 constructed on complex, but well-known, masonry work, not shown, making possible the heating of the pot. Above pot 5, there are disposed lip-tiles 6a and 6b made of refractory silico-aluminous material and suspended on cooled transversely extending bars 10.

Lip-tiles 6 and at opposed vertical walls 7 in front of which there are disposed two hollow transverse and parallel plates or lip-tile coolers 8a and 8b. These plates extend from one side of pot 5 to the other and contain circulating cooling water. In the framework of the installation under consideration, the height H of coolers 8a and 8b is conventionally approximately 200 millimeters. The lower edges of coolers 8a and 8b are disposed in the immediate vicinity of the surface level 9 of the glass bath. The distance D between front surfaces 7 defines the width of drawing chamber 11. This width is conventionally in the order of 450 millimeters and practically does not exceed 500 millimeters. These values are now considered to be critical.

The glass ribbon is formed in the drawing chamber 11 between the two coolers 8a and 8b. Above a swelling or bulb 12, also called meniscus or base portion, a glass sheet consisting of a soft plastic wall 13 rises and is then bent horizontally by a bending roll 14. Roll 14 is mounted for horizontal sliding movement as graphically indicated at 51 which permits a transverse displacement of several centimeters of the drawn ribbon 13. This makes it possible to vary the position of ribbon 13 as it is formed in the drawing chamber. The rollers 15 of a conveyor system advance the drawn and bent ribbon in the direction indicated by the arrow denoted G towards an annealing leer.

The draw pot 5 is covered by a refractory ceiling 16 while the separation between the atmospheres of chamber 1 and pot 5 is partially insured by means of a curtain of refractory blocks 17 which, in the embodiment described, also serve as supports for the upstream lip-tile 6a.

Finally, a tube 19 containing cool circulating water is placed between tank 2 and pot 5 for eliminating the seepage of molten glass from between the junction of these two chambers.

Such an apparatus is well-known in the prior art.

According to the invention the forward portion of bottom 22 of pot 5 is arranged under inclination and forms a spout 21.

Preferably, the inclined spout 21 starts from joint 23 that exists between tank 2 of chamber 1 and pot 5 proper. Spout 21 extends to a point which is substantially in vertical alignment with the upstream cooler 8a where it intersects along a junction edge 52 with the horizontal plane of the bottom 22. Due to this arrangement the depth K of the glass bath at the entrance of pot 5 is greater than the depth $k$ in other portions of the pot where bottom 22 is horizontal. Conventionally, $k$ has a value of 170 to 175 millimeters, while according to this invention the value of K is preferably between 220 and 225 millimeters. The slope of spout 21 is preferably between 14 and 16 percent.

Bottom 25 of tank 2 is arranged in a well-known manner. The slope of bottom 25 is identical to that of spout 21 and its height is such that it merges with pot 5 in a continuous manner as indicated at junction 23.

In order to better understand the modifications in the structure of well-known draw pots and the joining wall of the tank as proposed by this invention, there is shown in FIG. 3 in broken lines at 21a the conventional location of the upstream edge of the pot, and at 25a there is shown, also unbroken lines, the ascending slope of tank 2 in the downstream portion of the thermal conditioning chamber 1. The arrangement contemplated by the invention is clearly demonstrated by the instant diagram.

In cases where tank 2 has an inclined bottom (this well-known feature being shown at 53a in FIG. 4), the invention proposes to modify the slope of the downstream portion of this tank, as best shown at 53. In this manner the flat portion 54 terminating the tank, as well as the horizontal front portion 21a of draw pot 5, are eliminated.

It has been experienced that the arrangement set forth hereinabove improves in a surprising manner the operating conditions of the apparatus. The arrangement on one hand makes possible an increase in the draw speed (in the order of 8%), and on the other hand results in a substantial decrease of irregularities in the thickness of the glass formed.

The following explanation is given for this dual improvement without tying the invention to this explanation: the increase of the section of passage between tank 2 and pot 5 insures an increase in temperature of the low-lying layers of the glass which, on the other hand, results in a reduction in the viscosity thereof. It is to be noted that a temperature variation by 10° C. of the glass having usually a temperaure of 950° C. in the draw pot, modifies the viscosity by 50%. Furthermore, the friction between the bottom of pot 5 and the low-lying glass currents are reduced as they approach drawing chamber 11, thus facilitating the supply of glass to ribbon base 12.

Since the remainder of pot 5 (which has a parallelepipedal shape) is thus furnished with hotter glass, the risks of de-vitrification, which otherwise are very frequent at the bottom of the pot, are practically eliminated.

Also, due to the above-outlined construction, the effect of the cooling tube 19 on the glass bath vertically thereabove is proportionally reduced. This also limits the risk of de-vitrification.

The proposed arrangement also affects the hydrodynamic properties of the glass currents in pot 5 as will be understood in connection with FIG. 5. A bottom current $F_1$ (FIG. 5) consisting of hot glass travels upward along merging slopes 25 and 21. Beyond edge 52 terminating spout 21 the principal portion of current $F_1$ travels, due to the geometrical arrangement of the pot, directly towards meniscus 12. Current $F_1$ thus serves to feed the central portion of meniscus 12 which, in addition, receives two other, less hot "layers." These other two layers, having an increased viscosity, arrive from the surface of the glass bath upstream and downstream of meniscus 12. These two currents are designated $F_2$ and $F_3$. The latter, called a recirculating current, is delivered by bottom vein $F_4$ which itself originates from the non-ascendant portion of vein $F_1$.

The forming of ribbon 13, by means of a hot layer sandwiched between two cooler layers, has an important and favorable role in increasing the drawing speed. Furthermore, the ascendant current $F_1$ thus formed in the median portion of the pot has the tendency to impart an ascending motion to adjacent glass layers disposed downstream. It is thus avoided that layers below the recirculating current $F_3$ sink towards the bottom of the draw pot when they arrive in the central portion thereof. If, on the contrary, the recirculating currents $F_3$ sank instead of ascending toward the meniscus, they would close on themselves, whereby the risks of devitrification would become extremely great.

Figure 2:
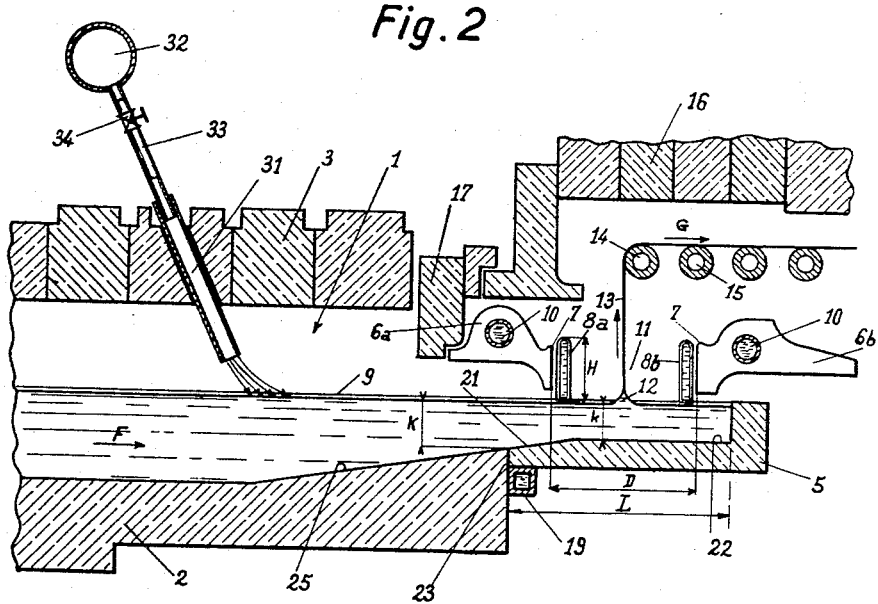
FIG. 2 is an axial section of a preferred embodiment of the invention.

According to the preferred embodiment of FIG. 2, the above features concerning the bottom of the draw pot are combined with an arrangement disclosed in the above-mentioned copending application. In particular, the ceiling 3 of chamber 1 comprises a series of inclined and parallel refractory tubes 31 (in quartz for instance) for introducing cooling air in the direction indicated by arrow F corresponding to the travel of the glass towards the draw pot 5.

These tubes are fed by means of a collector 32 and pipes 33 which are provided with emission control valves 34.

Also, the width D of the drawing chamber 11 has been increased to, for example, 550 millimeters, the height H of coolers 8a, 8b has been increased to 300 millimeters, while the internal length L of the draw pot 5 has not been changed.

By virtue of the above-mentioned arrangement, an air blowing operation may be carried out by means of tubes 31 wherein the air emission may be controlled separately for each tube. The air emission of each tube is controlled in accordance with the transverse irregularities in the thickness noted in drawn ribbon 13, in order to eliminate such irregularities.

The differential blowing of air makes it possible to suppress the significant transverse gradients of the surface temperature of the bath as it enters drawing chamber 11. The increase of the width of drawing chamber 11 and the increase of the height H of coolers 8 permit a significant increase of the surface cooling of the meniscus, what has a favorable effect on the increase of the drawing speed. This cooling operation may be even more vigorous without risking de-vitrification since the deepening of the upstream portion of pot 5 in accordance with the invention insures a better feed of deep-lying hot glass layers.

The improvement of the drawing conditions due in particular to the modification of the draw pot in the framework of the above-outlined combination is shown by the following numerical results:

| Thickness of glass (in tenths of millimeters) | 24 to 28 | 45 to 51 | 53 to 58 |
| --- | --- | --- | --- |
| (a) Apparatus as described above but having a draw pot of conventional profile: drawing speed in centimeters per minute) | 213 | 97.5 | 84 |
| (b) Apparatus as described above and comprising a draw pot according to and invention (drawing speed in centimeters per minute) | 230 | 105 | 90 |
| Gain in speed, percent | 8.25 | 7.7 | 7.5 |

A simultaneous and surprising improvement in the regularity of thickness of the drawn glass ribbon has been verified. This may be ascertained on a glass ribbon of a width of 3 meters, for instance, by taking nine measurements of thickness along the same transverse line and repeating this operation 24 times per day. Thus, it has been found that the dispersion index (deviation type measurement) will be as follows:

| Thickness of glass (in tenths of millimeters) | 24 to 28 | 45 to 51 | 53 to 58 |
| --- | --- | --- | --- |
| Profile of bottom (chamber 1 and pot 5): | | | |
| (a) Conventional deviation in tenths of millimeters | 1.20 | 1.78 | 2.01 |
| (b) According to the invention deviation in tenths of millimeters | 1.10 | 1.40 | 1.34 |

The specific influence of each previously-described means may be broken down as follows, for example, in the case of a glass having a thickness of 2.4 to 2.8 millimeters:

Means:    Increase in the drawing speed, percent
Inclined spout 21 _____ +8.25
Width D of drawing chamber having a value of 45 to 55 centimeters _____ +12
Height H of coolers 8a and 8b having a value of 200 to 300 millimeters _____ +7

The total gain in the drawing speed thus obtained is under the above conditions 29.5%.

The combination of these different means insuring a more rapid and more even formation of the surface layers of the drawn ribbon 13, thus makes possible an increase of the drawing speed in unforeseeable proportions.

Further, in accordance with the invention, modifications are proposed in the geometrical proportions of the drawn pot 5 and in the position of ribbon 13 with respect to the upstream limit of pot 5, such modifications being made possible by the acceleration of the phenomena relative to the formation of the drawn ribbon 13.

In this connection it has been recognized that for an apparatus as hereinbefore described (comprising an inclined upstream spout 21), the internal length L of the pot could be reduced with respect to the theoretical value of 1,050 millimeters conventionally used in the Libbey-Owens method. The relative reduction DL/L of length L is between 5 and 10%, the latter value assuring an optimal effect. In the case of a pot of conventional length of 1,050 millimeters the reduction DL is therefore between 52 and 105 millimeters. Thus, the internal length of the pot should not exceed 1000 millimeters and should be preferably between 945 and 950 millimeters.

It is preferable, however, not to modify in the same manner the upstream length $L_m$ and downstream length $L_v$ in case of a given reduction DL. As seen in FIG. 6a, the length $L_m$ and $L_v$ are distances of the ribbon 13 from the entrance and from the terminal wall of the drawing pot, respectively. In this connection it is noted that the base portion 12 is normally placed in the middle of the draw pot so that $L_m=L_v$. According to the invention it is proposed to reduce the downstream portion more than the upstream portion. In other words, for a given DL, $DL_v$ is increased by the same amount as $DL_m$ is decreased, thus observing at all times the equality $DL=DL_m+DL_v$.

An advantageous value for the ratio $DL_m/DL_v$ is in the order of 2/3, thus $DL_v=3DL/5$.

Thus, in the case where $L=1,050$ and $DL=105$ millimeters, preferably $DL_v=63$ millimeters and $DL_m=42$ millimeters. In practice this new improvement means that the plane of symmetry of the meniscus is located at a distance $L^b{}_v$ from the downstream terminal wall of the pot which distance being at least 60 millimeters less than the distance $L_v$ conventionally used. In practice $L^b{}_v$ is together inferior to the half length of the pot and set between 460 and 495 millimeters.

Such a dimensional modification is shown true to scale in FIGS. 6a and 6b. FIG. 6a illustrates an apparatus having a conventional draw pot, while FIG. 6b shows an arrangement of the draw pot modified according to the invention. The downstream terminal wall 55a of the pot shown in FIG. 6a has been displaced by a value DL in an upstream direction and designated as 55b in FIG. 6b. Similarly, the drawn ribbon 13a, which initially was located in the middle of the pot, has been displaced in an upstream direction by a value $DL_m$. The new position of the ribbon is indicated at 13b in FIG. 6b. Thus, the distance between the ribbon 13b and the terminal wall 55b has been curtailed by $DL_v$. The values of length L, $L_m$ and $L_v$ have been modified for the pot shown in FIG. 6b to read $L^b$, $L^b{}_m$ and $L^b{}_v$ ($L^b=945$, $L^b{}_m=483$, $L^b{}_v=462$ millimeters).

Changing of the draw pot is a conventional operation; no difficulties are encountered by attaching a draw pot 10 centimeters shorter. Shifting of ribbon 13 is obtained by displacing bending roll 14 in the manner indicated hereinbefore. This operation also can be easily achieved. It is, therefore, seen that the transformations proposed by the invention can be easily carried out.

It has been proven in practice that the above-described modifications of the geometry of the draw pot and the correlated displacement of the ribbon 13 (which may not be carried out unless an oblique spout 21 is arranged at the entrance of the draw pot) for all practical purposes totally suppress the risks of de-vitrification in the rear of pot 5. This result is extremely important. All glass manufacturers are aware of the permanent risks of de-vitrification in the terminal portion of the draw pot in the Libbey-Owens process and the measures which have to be conventionally applied in order to eliminate them. These measures include various means of re-heating the glass in that region.

This result may be explained a posteriori by the fact that the significant relative closeness (corresponding to an increased $DL_v$ between ribbon 13 and wall 55) forces the glass to renew itself more rapidly downstream of ribbon 13 than it does in the conventional draw pots.

Furthermore, it was experimentally proven that the previously-described arrangement reduces the duration of travel of the glass along the recirculating current $F_3$. Thus, a surprising new result appears according to which this reduction in the duration is considerably more than that which would result from a simple reduction in the value $DL_v$ for the course followed by the glass. In other words, the arrangement proposed by this invention results in a marked increase of the drawing speed.

Figure 7A:
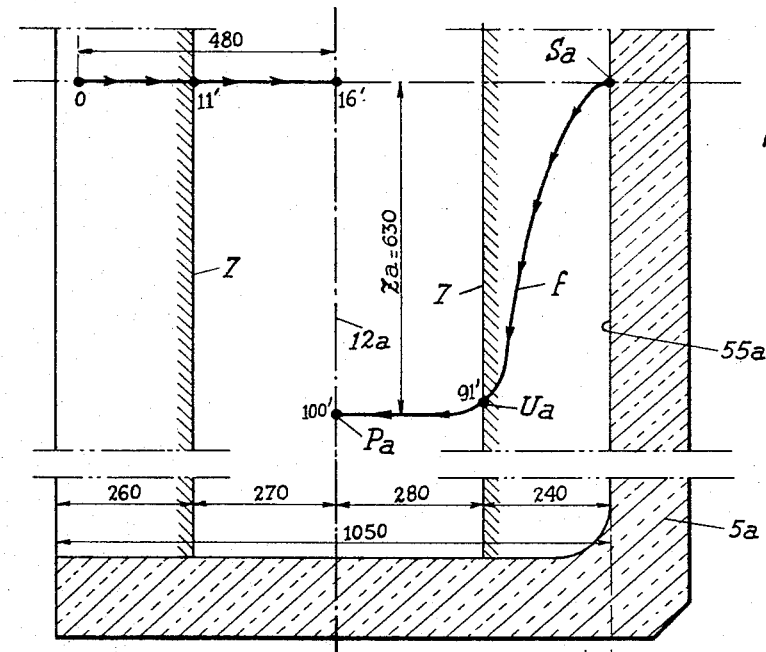
FIGS. 7a and 7b are enlarged schematic plan views relating to two other arrangements of the drawing pot.
Figure 7B:
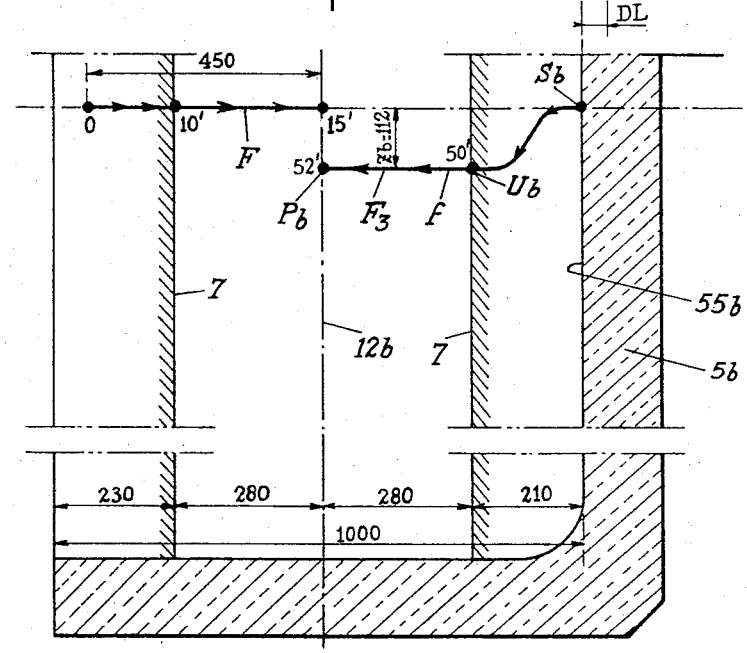

The corresponding results are shown in FIGS. 7a and 7b where only the important data and surfaces are indicated. FIG. 7a illustrates a draw pot of conventional arrangement such as shown in FIG. 6a. FIG. 7b illustrates a draw pot according to the invention wherein the length L of the draw pot is reduced as little as possible within the scope of the instant invention and wherein the upstream displacement of the base portion 12b equals $3DL/5$.

It is to be noted that the velocity of current $F_2$ has strictly not changed. The situation is far different, however, in connection with current $F_3$. In the case of FIG. 7a the float $f$ exposed to currents $F_3$ needed 100 minutes to travel from the terminal wall 55 (point $S^a$) to base portion 12, whereas in the arrangement according to FIG. 7b it required merely 52 minutes to travel from point $S^b$ to the homologous point $U^b$. Thus, the average velocity has practically doubled. In addition, the time required by the float $f$ to travel from point $U^a$ (or $U^b$) vertically below the downstream lip-tile 7 to meniscus 12 (point $P^a$ or $P^b$) is nine minutes in the first case and two minutes in the second, which corresponds to an increase in velocity by 4.5 times. It is noted that the distance between points U and P is practically equal in both cases.

It is finally noted that, in the embodiment according to FIG. 7b, the currents are significantly straightened in the rear portion of the pot since the distance Z corresponding to the lateral deviation has been reduced from $Z^a=630$ millimeters to $Z^b=112$ millimeters. These various results could be even more improved if the length $L^a$ were reduced more, taking for example a pot having a length of $L^b=945$ millimeters such as shown in FIG. 6b.

It is also important to note that the indicated improvements due to the geometrical arrangement according to the invention is practically independent from the width of pot 5, what imparts to the numerical values above referred to a critical character.

It is considered a surprising fact that a small modification of the arrangement of the front and rear parts of the draw pot and a modification of the position of the meniscus result in so substantial changes in the operating conditions of the machine.

In order to compare the drawing speeds obtained on one hand by a conventional machine and on the other hand by a machine improved (1) by a differential blowing operation in the thermal conditioning chamber and by an enlarged drawing chamber having coolers of increased height and further improved (2) by the modifications according to this invention (inclined spout 21 upstream the pot, the downstream wall 55 displaced upstream and the meniscus 12 shifted upstream in a lesser amount), curves as a function of the thickness of the drawn ribbon are plotted as shown in FIG. 8. In this figure the abscissae represent thicknesses $e$ in one-tenth of millimeters and the ordinates represent the drawing speed V in meters per minute. With the conventional machine the curve $W^a$ is obtained and with a machine improved as above set forth a curve $W^b$ can be plotted. It is seen that the increase in speed is 20% for lesser thicknesses (18.5 tenths of millimeters) and 40% for more substantial thicknesses (65 tenths of millimeters).

In addition to this increase in the drawing speed which is of great importance and which is made possible by the invention, it is to be noted that the defects inherent to the drawing process are also corrected: the risks of devitrification are practically eliminated, the surface quality is improved and the thickness is made regular.

I claim:

1. In an installation for the vertical drawing from a molten glass bath of a soft glass ribbon which is thereafter horizontally bent, said installation comprising a glass melting tank, a thermal conditioning chamber and a draw pot, arranged in end to end communicating relationship and defined by separating walls, said thermal conditioning chamber being positioned between said glass melting tank and said draw pot and having a bottom at least partly upwardly inclined towards said draw pot, said draw pot including an inclined spout section and a drawing chamber, said drawing chamber being defined by two spaced, parallel, transversely extending coolers and a horizontal floor and communicating with the thermal conditioning chamber through said inclined spout section, said inclined spout section having an inclined floor located between said heat conditioning chamber inclined bottom and said draw-pot horizontal section, and being substantially aligned with said thermal conditioning chamber inclined bottom.

2. Installation according to claim 1, wherein the slope of said draw pot bottom inclined spout is between about 14 and 16%.

3. Installation according to claim 1, in which the height of the walls surrounding the melting tank and conditioning chamber and draw pot is such that the draw pot has a depth of at least about 225 millimeters.

4. Installation according to claim 1 in which said draw pot constitutes a basin accommodating said molten glass bath and wherein the length of said basin is at most equal to 1000 millimeters.

5. Installation according to claim 4, wherein said length is between about 945 and 950 millimeters.

6. Installation according to claim 1, in which said draw pot constitutes a basin which is limited opposite to said thermal conditioning chamber by a vertical wall and includes means to withdraw said soft glass ribbon at a predetermined point, wherein the distance between said predetermined point and said terminal wall is together less than the half length of said draw pot basin.

7. Installation according to claim 6, wherein said distance is between about 460 and 490 millimeters.

References Cited by the Examiner

UNITED STATES PATENTS

| | | | |
|---|---|---|---|
| 1,547,910 | 7/1925 | Ferngren | 65—202 |
| 1,554,269 | 9/1925 | Ferngren | 65—203 X |
| 1,609,998 | 12/1926 | Ferngren | 65—202 |
| 1,609,999 | 12/1926 | Ferngren | 65—196 |
| 1,751,045 | 3/1930 | Mambourg. | |
| 1,818,231 | 8/1931 | Mambourg | 65—202 |
| 3,000,142 | 9/1961 | Long. | |
| 3,251,669 | 5/1966 | Dunipace | 65—203 X |

DONALL H. SYLVESTER, *Primary Examiner.*

J. H. NEWSOME, *Assistant Examiner.*